United States Patent
Abke et al.

(10) Patent No.: US 10,604,191 B2
(45) Date of Patent: Mar. 31, 2020

(54) VEHICLE FRAME CONSTRUCTION AND METHOD

(71) Applicant: Honda Motor Co., Ltd., Tokyo (JP)

(72) Inventors: Timothy A. Abke, Zanefield, OH (US); Duane Trent Detwiler, Powell, OH (US)

(73) Assignee: Honda Motor Co., Ltd., Tokyo (JP)

( * ) Notice: Subject to any disclaimer, the term of this patent is extended or adjusted under 35 U.S.C. 154(b) by 65 days.

(21) Appl. No.: 15/825,317

(22) Filed: Nov. 29, 2017

(65) Prior Publication Data

US 2019/0161128 A1    May 30, 2019

(51) Int. Cl.
| | |
|---|---|
| *B62D 25/06* | (2006.01) |
| *B62D 27/02* | (2006.01) |
| *B62D 29/00* | (2006.01) |
| *B62D 25/02* | (2006.01) |

(52) U.S. Cl.
CPC ........... *B62D 27/02* (2013.01); *B62D 25/025* (2013.01); *B62D 25/06* (2013.01); *B62D 29/007* (2013.01); *B62D 29/008* (2013.01)

(58) Field of Classification Search
CPC .... B62D 25/06; B62D 29/007; B62D 29/008; B62D 27/02
USPC ................................. 296/210, 187.13, 193.12
See application file for complete search history.

(56) References Cited

U.S. PATENT DOCUMENTS

| | | | |
|---|---|---|---|
| 3,316,627 A | 5/1967 | Suzuki et al. | |
| 3,891,789 A * | 6/1975 | Swengel, Sr. | B23K 9/22 174/261 |
| 7,900,997 B2 * | 3/2011 | Hosaka | B62D 25/07 296/193.12 |
| 7,997,643 B2 | 8/2011 | Shah et al. | |
| 9,266,190 B2 * | 2/2016 | Bonnen | B23K 20/06 |
| 9,421,636 B2 * | 8/2016 | Golovashchenko | B23K 20/06 |
| 9,610,981 B1 * | 4/2017 | Bach | B62D 25/06 |
| 9,676,054 B2 * | 6/2017 | Bonnen | B23K 20/06 |
| 9,868,476 B1 * | 1/2018 | Pastrick | B62D 27/023 |
| 10,065,694 B1 * | 9/2018 | Rompage | B62D 65/02 |
| 10,160,501 B1 * | 12/2018 | Nania | B62D 25/06 |
| 2005/0140158 A1 * | 6/2005 | Ogawa | B62D 25/07 296/29 |
| 2006/0255627 A1 * | 11/2006 | Hirotani | B60J 7/003 296/214 |

(Continued)

FOREIGN PATENT DOCUMENTS

| | | | | |
|---|---|---|---|---|
| DE | 102010051784 | * | 7/2011 | .......... B62D 25/082 |
| DE | 102014114348 | | 4/2016 | |

(Continued)

OTHER PUBLICATIONS

Computer generated translation of DE 102010051784 (Year: 2011).*

(Continued)

*Primary Examiner* — Gregory A Blakenship
(74) *Attorney, Agent, or Firm* — Rankin, Hill & Clark LLP

(57) ABSTRACT

A vehicle frame construction or frame assembly and method for assembling a multi-material vehicle frame includes a first frame member formed of a first metal material and a second frame member formed of a second metal material that is dissimilar to the first metal material. The second frame member is joined to the first frame member via vaporizing foil actuator welding (VFAW).

17 Claims, 8 Drawing Sheets

(56) References Cited

U.S. PATENT DOCUMENTS

| | | | |
|---|---|---|---|
| 2009/0108634 A1* | 4/2009 | Reed | B62D 25/04 296/210 |
| 2013/0181487 A1* | 7/2013 | Krueger | B62D 25/06 296/210 |
| 2013/0283878 A1* | 10/2013 | Vivek | B21D 26/021 72/60 |
| 2014/0008940 A1* | 1/2014 | Adamski | B62D 25/06 296/210 |
| 2014/0138988 A1* | 5/2014 | Kisaku | B62D 25/02 296/210 |
| 2014/0217783 A1* | 8/2014 | Hida | B62D 25/06 296/210 |
| 2014/0265453 A1* | 9/2014 | Hinz | B62D 25/06 296/210 |
| 2014/0319877 A1* | 10/2014 | Hida | B62D 25/02 296/191 |
| 2015/0217812 A1* | 8/2015 | Hinz | B62D 25/06 296/210 |
| 2015/0375794 A1* | 12/2015 | May | B62D 27/023 296/187.12 |
| 2016/0039041 A1* | 2/2016 | Bonnen | B23K 20/06 219/611 |
| 2016/0039471 A1* | 2/2016 | Bach | B62D 25/06 296/193.06 |
| 2016/0138637 A1* | 5/2016 | Kurokawa | F16B 5/045 411/82.1 |
| 2017/0349220 A1* | 12/2017 | Yamada | B21D 39/00 |
| 2018/0036828 A1* | 2/2018 | Detwiler | B23K 11/0026 |
| 2018/0257718 A1* | 9/2018 | Kagami | B62D 27/02 |
| 2018/0297644 A1* | 10/2018 | Rompage | C25D 13/12 |
| 2018/0346034 A1* | 12/2018 | Sheldon | B62D 25/06 |
| 2018/0361498 A1* | 12/2018 | Zhang | B23K 11/14 |
| 2019/0015925 A1* | 1/2019 | Vivek | B23K 20/22 |
| 2019/0061042 A1* | 2/2019 | Hahnlen | B23K 11/20 |
| 2019/0061045 A1* | 2/2019 | Vivek | B23K 20/08 |

FOREIGN PATENT DOCUMENTS

| | | |
|---|---|---|
| DE | 102015207910 | 11/2016 |
| EP | 1580098 | 9/2005 |
| JP | 4317352 | 8/2009 |

OTHER PUBLICATIONS

International Metallographic Society, Sepetember 1, 2016, Welding technique helps vehicles lose weight, https://www.asminternational.org/web/ims/news/-journal_content/56/10180/26780214/NEWS.

* cited by examiner

VEHICLE FRAME CONSTRUCTION AND METHOD

BACKGROUND

Modern vehicles sometimes use multi-material assemblies for frame members. For example, roof rails can be constructed of a first aluminum member and a second steel member. These different material members are joined together through various joining techniques, such as using a combination of resistance spot welding (RSW) and riveting, depending on the specific materials being joined. Drawbacks of such joining techniques are that they can be costly, time-consuming, can add extra weight to the vehicle, etc. Also, countermeasures are sometimes used to ensure the desired strength of the frame member is achieved when such joining techniques are used to join dissimilar materials (e.g., stiffeners added additional fasteners added, additional fastening locations needed, etc.).

SUMMARY

According to one aspect, a vehicle frame construction includes a first frame member formed of a first metal material and a second frame member formed of a second metal material that is dissimilar to the first metal material. The second frame member is joined to the first frame member via vaporizing foil actuator welding (VFAW).

According to another aspect, a multi-material frame assembly for a vehicle includes a first frame member formed of a first metal material and a second frame member formed of a second metal material that is dissimilar to the first metal material. The frame assembly further includes a reinforcement insert interposed between a first frame member and a second frame member. The reinforcement insert is formed of the first metal material and joined to the first frame member via at least one similar metal material joining technique. A second frame member is joined to at least one of the first frame member for the reinforcement insert via vaporizing foil actuator welding (VFAW).

According to a further aspect, a method for assembling a multi-material vehicle frame includes providing a first frame member formed of a first metal material and providing a second frame member formed of a second metal material that is dissimilar to the first metal material. In the method, the second frame member is joined to the first frame member via vaporizing foil actuator welding (VFAW).

DETAILED DESCRIPTION

Figure 1:
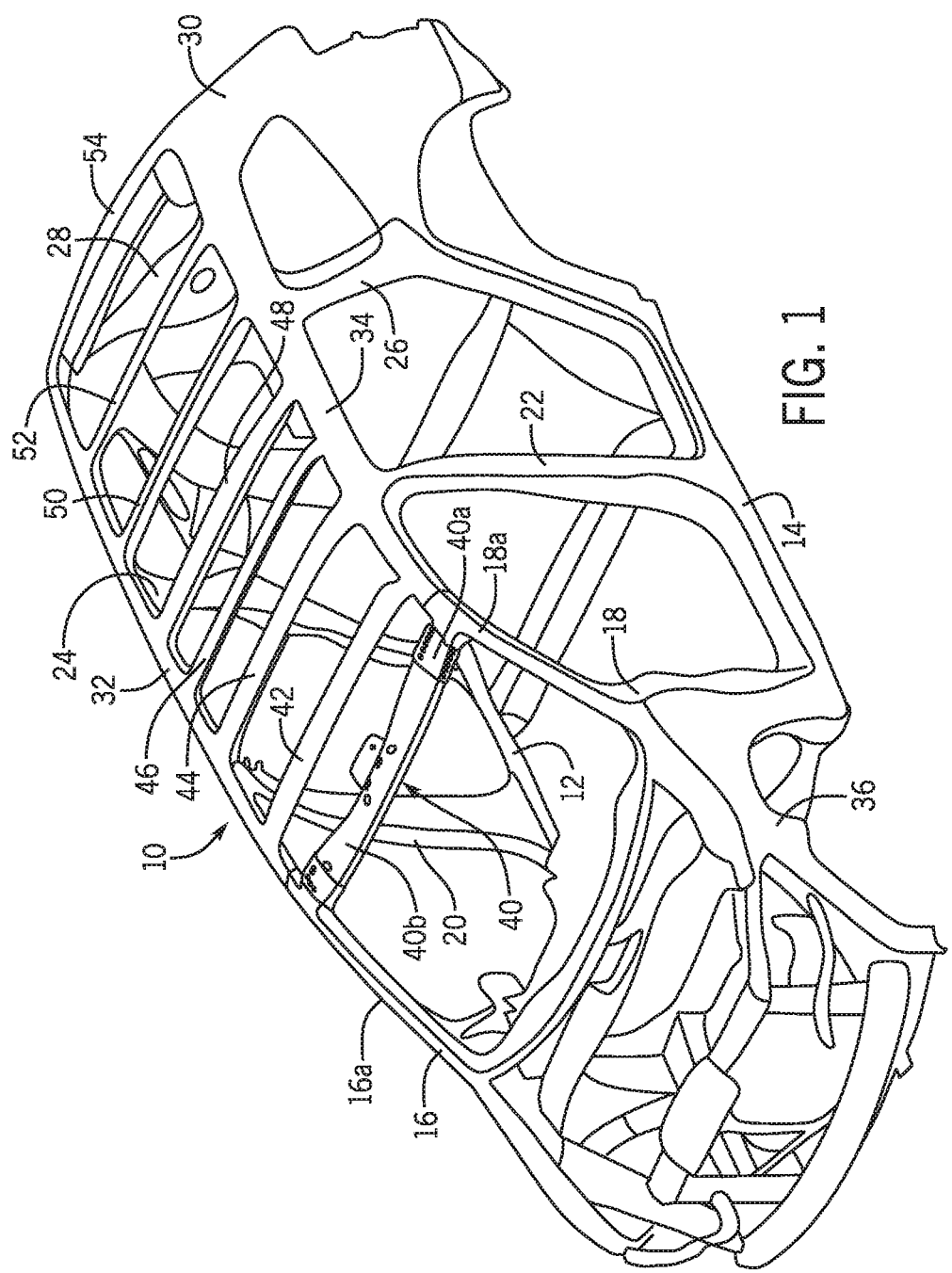
FIG. 1 is a perspective view of a vehicle frame assembly or construction according to an exemplary embodiment.

Referring now to the drawings wherein the showings are for purposes of illustrating one or more exemplary embodiments and not for purposes of limiting the same, a multi-material frame assembly or construction for a vehicle is shown in FIG. 1 and generally indicated by reference numeral 10. The frame assembly 10 includes and is defined by a plurality of hollow closed frame members. These frame members can include, for example, side sill members 12, 14, A-pillars 16, 18, B-pillars 20, 22, C-pillars 24, 26 and D-pillars 28, 30 supporting longitudinal roof rails 32, 34. The frame assembly 10 can also include a forward or front frame sub-assembly 36 defining the engine compartment, a front lateral roof rail 40 and several other lateral roof rails 42, 44, 46, 48, 50, 52 and 54 disposed rearwardly of the front lateral roof rail 40, among other frame members. The lateral roof rails 40-54 generally extend between the side roof rails 32, 34 and/or upper portions (e.g., upper portions 16a, 18a) of the pillars 16-28. In the illustrated embodiment, and as will be described in more detail below, the forward lateral roof rail 40 extends between upper portions or sections 16a, 18a of the A-pillars 16, 18 and is secured to the upper sections 16a, 18a.

With additional reference to FIGS. 2-7, the vehicle frame construction 10, and particularly the forward lateral roof rail 40 thereof, includes a first frame member 60 formed of a first metal material and a second frame member 62 formed of a second metal material that is dissimilar to the first metal material. For example, in one embodiment, the first metal material can be steel (or a steel alloy) and the second metal material can be aluminum (or an aluminum alloy). Other examples for the metal materials include magnesium or magnesium alloys, titanium or titanium alloys, zinc or zinc alloys, etc.

As will be discussed in more detail below, the second frame member 62, which can be formed of aluminum or an aluminum alloy, is joined to the first frame member 60, which can be formed of steel or a steel alloy, via vaporizing foil actuator welding (VFAW), which has been found to impart certain advantages to joined members formed of dissimilar steel materials. The vaporizing foil actuator welding (VFAW) used for joining the second frame member 62 to the first frame member 60 can be via the process disclosed in U.S. Pat. No. 9,021,845, expressly incorporated herein by reference.

When comprising the forward lateral roof rail 40, the first frame member 60 is a first roof rail member and the second frame member 62 is a second roof rail member. As shown in FIG. 1, the first and second roof rail members 60, 62 extend laterally between associated side frame members, which in the illustrated exemplary embodiment are the upper sections 16a, 18a of the A-pillars 16, 18. In particular, the first roof rail member 60 can be a lower roof rail member and the second roof rail member 62 can be an upper roof rail member arranged to extend along a substantial portion of a longitudinal extent of the lower roof rail member 60 between the associated side frame members, i.e., the A-pillars 16, 18.

The roof rail 40 can further include at least one reinforcement insert (e.g., reinforcement inserts 64, 66) interposed between the first frame member 60 and the second frame member 62. The reinforcement insert 64 can particularly be interposed between the first frame member 60 and the second frame member 62 at a first end 40a of the roof rail 40 at which the roof rail 40 joins to the A-pillar 16. Likewise, the reinforcement insert 66 can be interposed between the first frame member 60 and the second frame member 62 at a second, opposite end 40b of the roof rail 40. The reinforcement insert 64 can be formed of the first metal material that is the same first metal material that is used to form the first frame member 60. The reinforcement inserts 64, 66 can be joined to the first frame member 60 via at least one similar metal material joining technique. One such technique is resistance spot welding (RSW). In one embodiment, the reinforcement inserts 64, 66 are joined to the first frame member 60 via RSW.

In contrast, the second frame member 62, which is formed of the second metal material that is dissimilar to the first metal material of the first frame member 60 and the reinforcement inserts 64, 66, can be joined to the first frame member 60 via VFAW. While in the illustrated embodiment, the second frame member 62 is joined to only the first frame member 60 via VFAW, it is contemplated that the second frame member 62 can be joined additionally or in the alternative to the reinforcement inserts 64, 66 via VFAW. In one embodiment, the second frame member 62 is joined to the first frame member 60 and/or the reinforcement inserts 64, 66 only via VFAW. That is, no other joining techniques, such as riveting, are used to join the second frame member 62 to the first frame member or to the reinforcement inserts 64, 66. In the same or another embodiment, the second metal material can be lighter or have a lower density than the first metal material for reducing weight of the vehicle frame construction 10. As mentioned, the second metal material can be aluminum or aluminum alloy and the first metal material can be steel or steel alloy.

Figure 2:
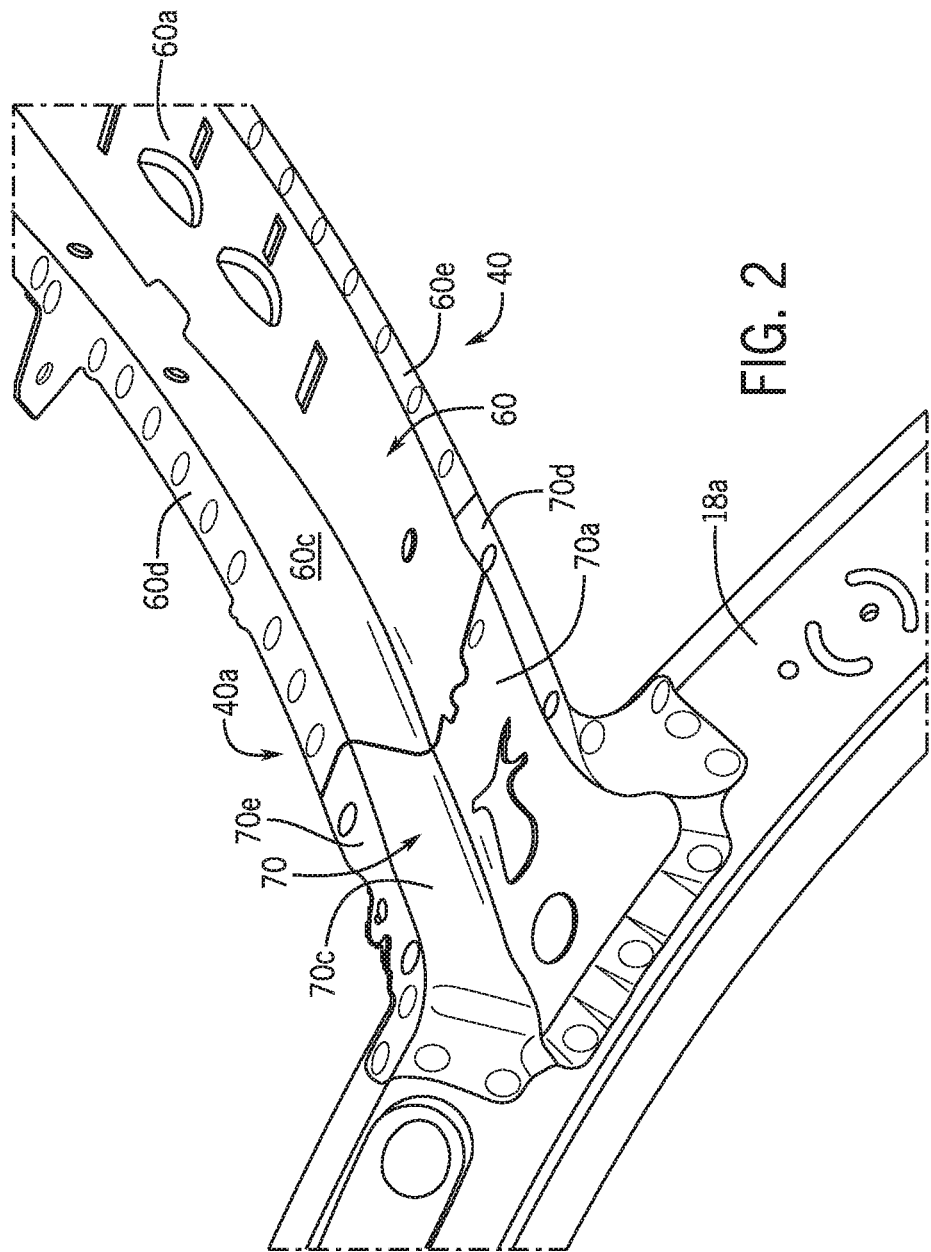
FIG. 2 is a partial perspective view of the vehicle frame construction showing a roof rail secured to a side frame member, both of the vehicle frame assembly of FIG. 1.
Figure 3:
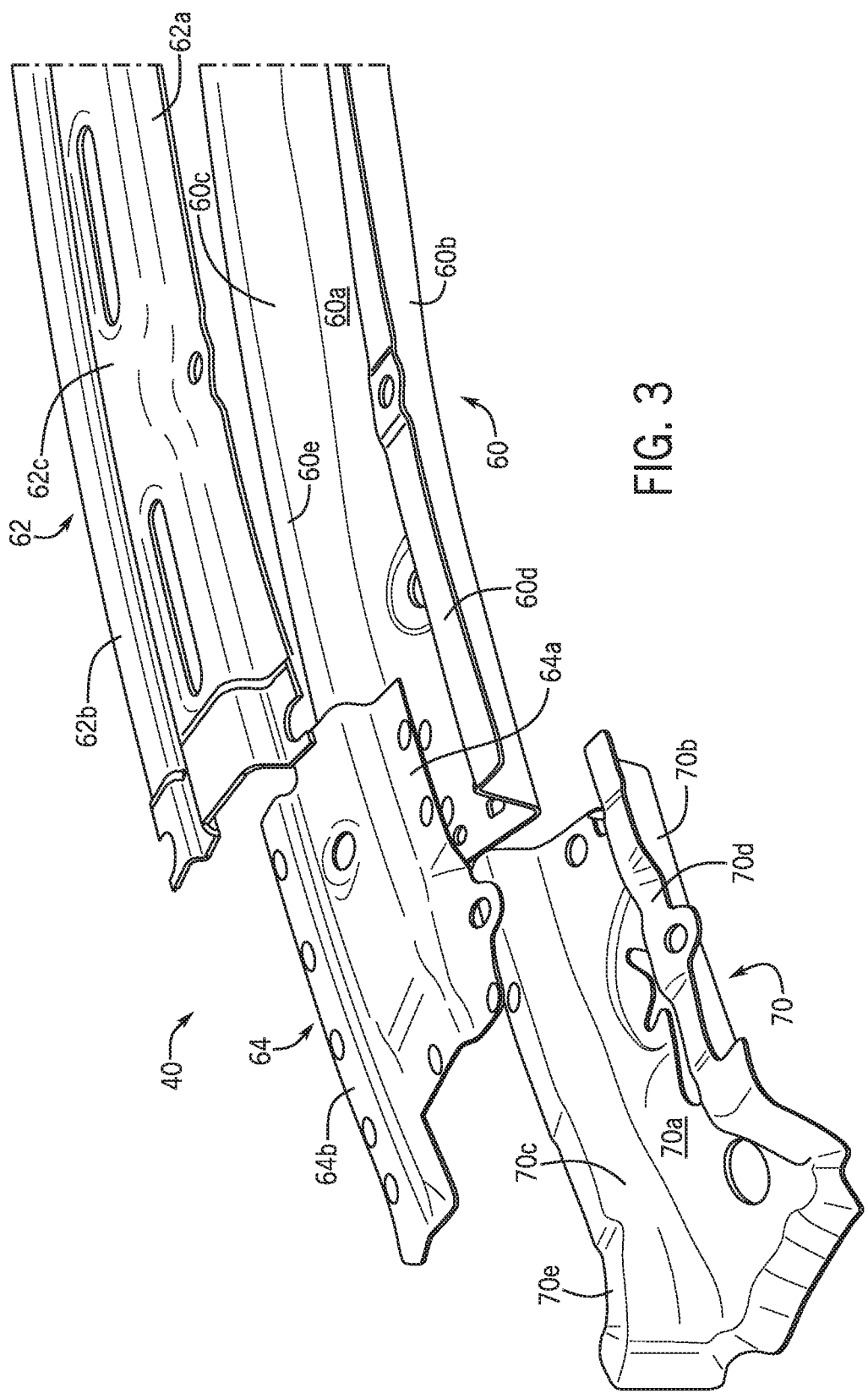
FIG. 3 is a partial exploded perspective view of one end of the roof rail showing a first frame member, a second frame member, a reinforcement insert and a bracket.

With particular reference to FIGS. 2-3, the first end 40a is shown and shown in FIG. 2 attaching to the upper section 18a of the A-pillar 18. As illustrated, the first frame member 60 includes a base wall 60a, spaced apart side walls 60b, 60c extending upward from the base wall 60a that together with the base wall 60a define a lower roof rail U-shaped open section. The first frame member 60 can also include lower roof rail welding flanges 60d, 60e extending outwardly from a spaced apart sidewall 60b, 60c and located distally relative to the base wall 60a. The second frame member 62 can include upper roof rail welding flanges 62a, 62b that are joined to the lower roof rail flanges via VFAW to close the open section. In the illustrated embodiment, the second frame member 62 further includes a raised middle portion 62c protruding upwardly relative to the flanges 62a, 62b. The reinforcement insert 64 can likewise include reinforcement insert flanges 64a, 64b that are joined to the lower roof rail welding flanges 60d, 60e via resistance spot welding. Though not shown in detail, the reinforcement insert 66 can be formed the same as the reinforcement insert 64, though mirrored relative thereto.

For joining the roof rail 40 to the A-pillars 16, 18, the vehicle frame construction 10 can further include brackets 70, 72, respectively at each end. In particular, the brackets 70, 72 can be formed of the first metal material (e.g., steel) for joining to the associated side frame members, which in a case of the roof rail 40 are the A-pillars 16, 18, such as via resistance spot welding or some other joining technique. Specifically, the bracket 70 is used for joining the first end 40a of the roof rail 40 to the A-pillar 18 and the bracket 72 is used for joining the second end 40b of the roof rail to the A-pillar 16. Since they are formed of the same metal materials, the reinforcement inserts 64, 66 and the first frame number 60 can be joined to the brackets 70, 72 via resistance spot welding.

As shown in the illustrated embodiment in regard to the bracket 70, particularly in FIGS. 2 and 3, the bracket 70 can have a bracket U-shape into which the first frame member U-shaped open section is complementarily received. In particular, the bracket 70 can have a base wall 70a, side walls 70b, 70c extending upward from the base wall 70a in spaced relation to one another and welding flanges 70d, 70e. Though not shown in the same detail, the bracket 72 can be formed the same as the bracket 70, though mirrored relative thereto.

Figure 4:
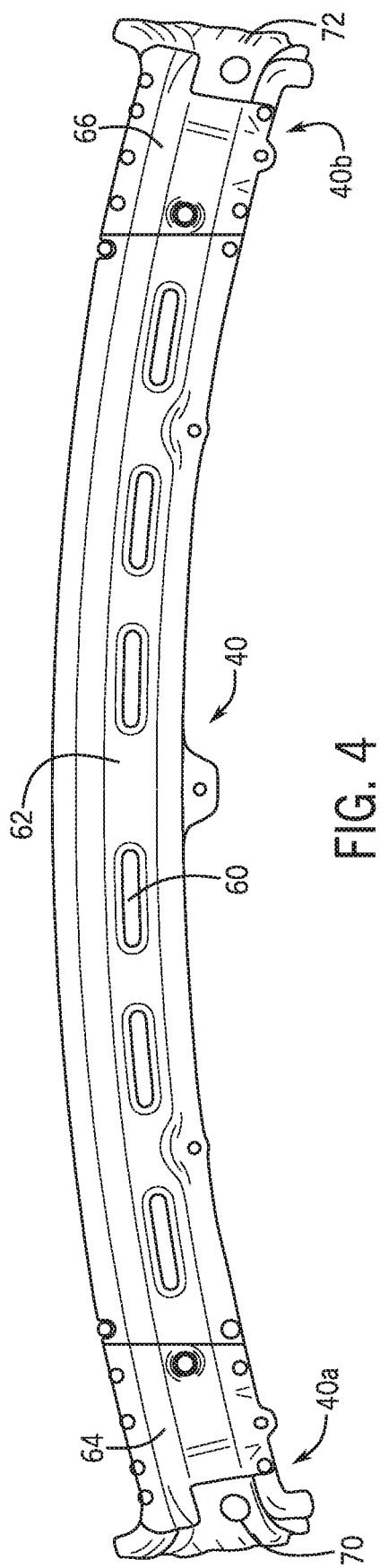
FIG. 4 is a top plan view of the roof rail of FIG. 1 shown in isolation.
Figure 5:
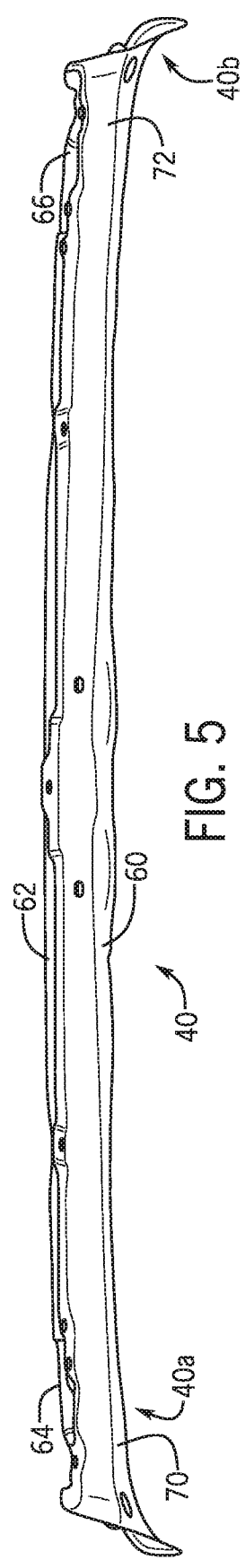
FIG. 5 is a partial enlarged side elevation view of the roof rail of FIG. 4.

The reinforcement insert 64 can be positioned so as to close the open section defined by the bracket 70 (and likewise the reinforcement insert 64 can be positioned so as to close the open section defined by the bracket 72). Complementing this, the second frame member 64 closes the open section defined by the first frame member 60 between the brackets 70, 72. Also, as shown in FIGS. 4 and 5, the second frame member overlaps the reinforcement inserts 64, 66. This is best shown in FIGS. 6 and 7 with respect to the reinforcement insert 62 and the bracket 70, both disposed at the first end 40a of the roof rail 40 and is applicable to the reinforcement insert 64 and the bracket 72 at the second end 40b though not shown in detail.

Figure 6:
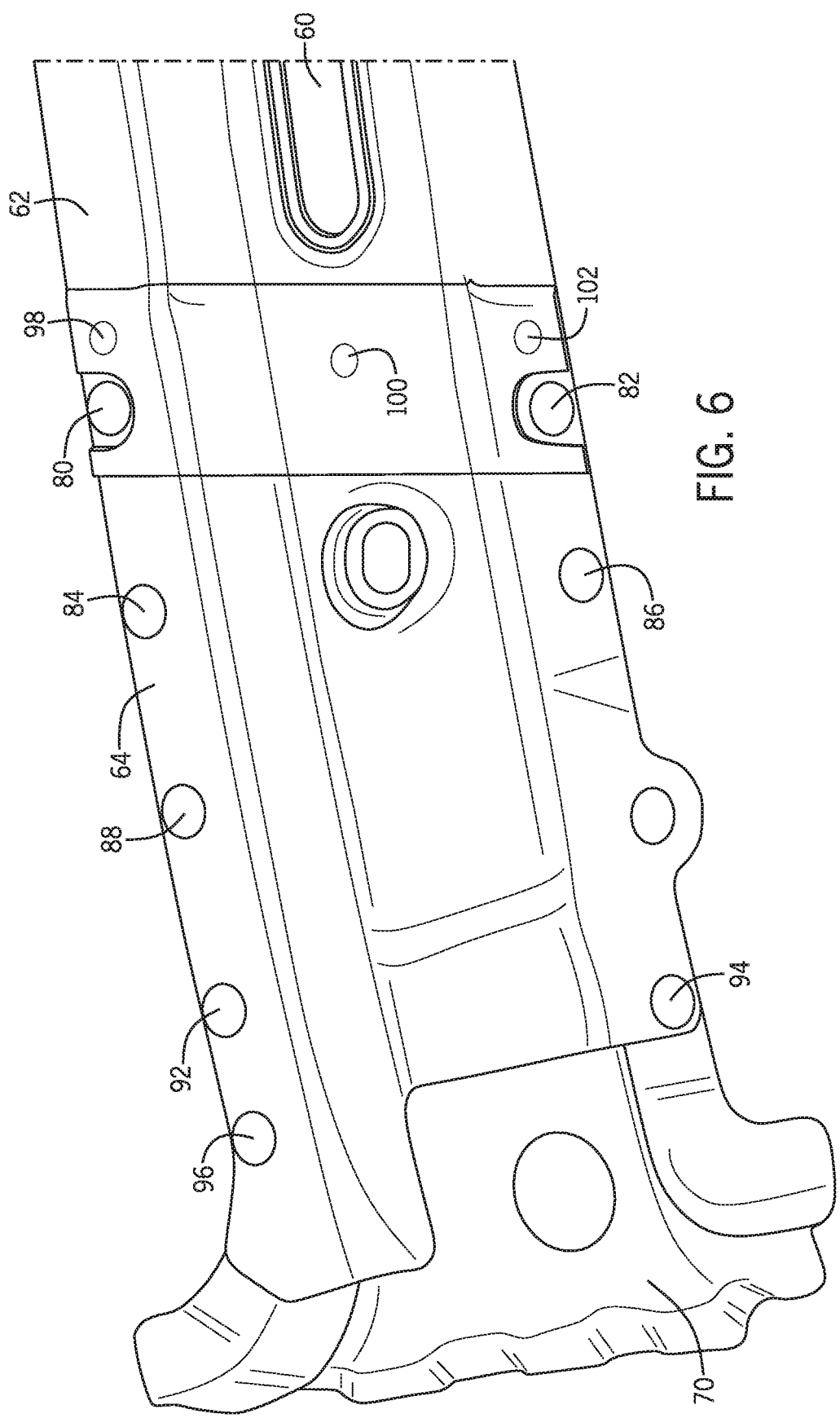
FIG. 6 is a partial enlarged plan view similar to FIG. 4 but showing one end of the roof rail.
Figure 7:
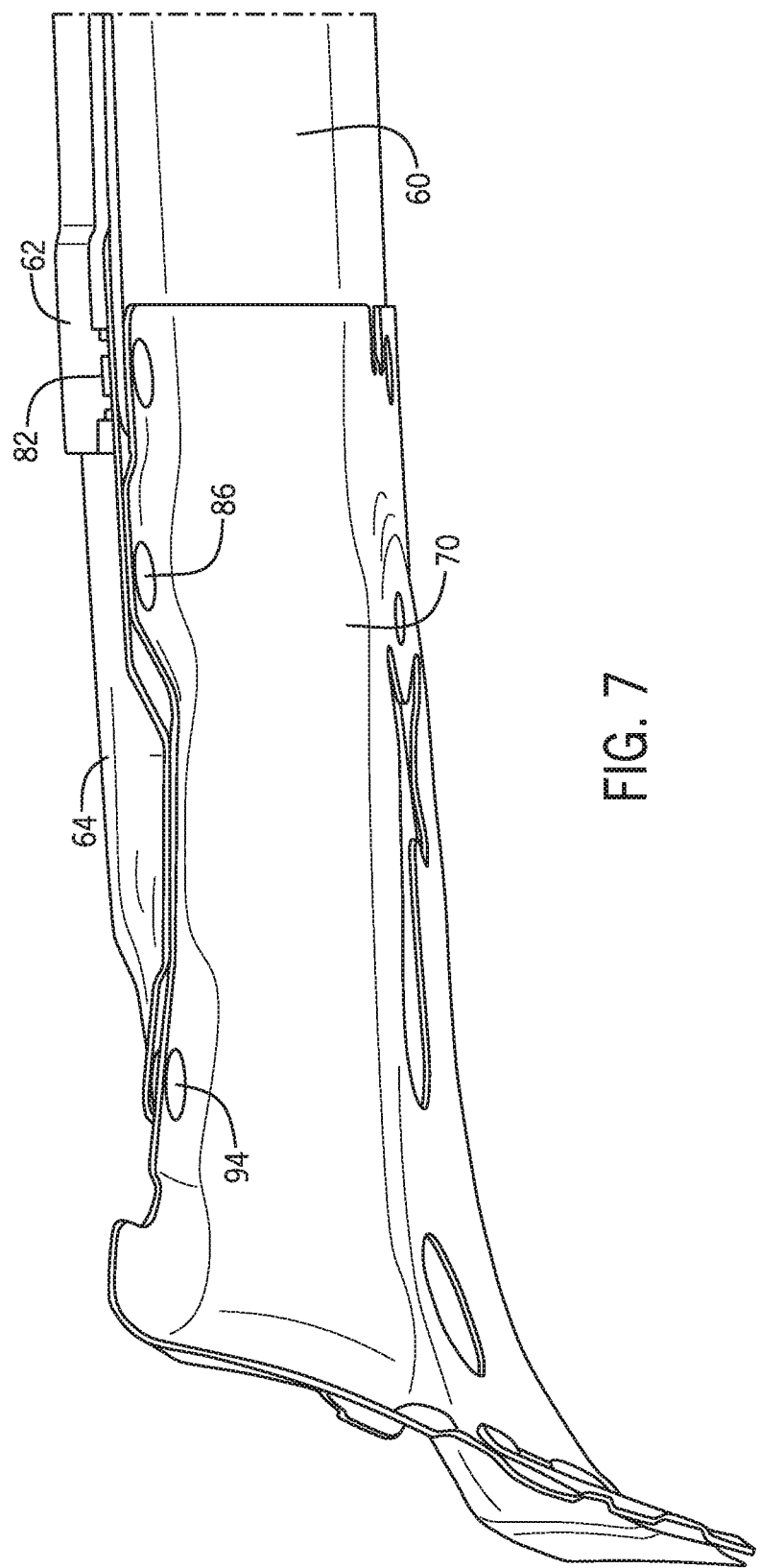
FIG. 7 is a side elevation view of the roof rail similar to FIG. 5 but showing only one end thereof as an enlarged partial view.

Continuing specific reference to FIGS. 6 and 7, in one embodiment, resistance spot welding is used at the first end 40a, particularly at locations 80 and 82, to secure the first frame member 60 to the bracket 70. Likewise, resistance spot welding is used at the first end 40a, particularly at locations 84, 86, 88 and 92 to secure the reinforcement insert 64 to the bracket 70. Cut-out apertures 94, 96 can be defined in the second frame member 62 to enable resistance spot welding at the locations 80 and 82 between the reinforcement insert 64 first frame member 60. In one embodiment, VFAW can be used at locations 98, 100, 102 to secure the first frame member 60 to the second frame member 62. Though not shown, the same arrangement of resistance spot welding and VFAW can be used at the second end 40b, though mirrored relative to the first end 40a. Of course, it should be understood that other joining techniques could be used to join any of the similar metal materials together (i.e., to join the reinforcement inserts 64, 66 to the first frame member 60 and/or to join the first frame member 60 to the brackets 70, 72).

Figure 8:
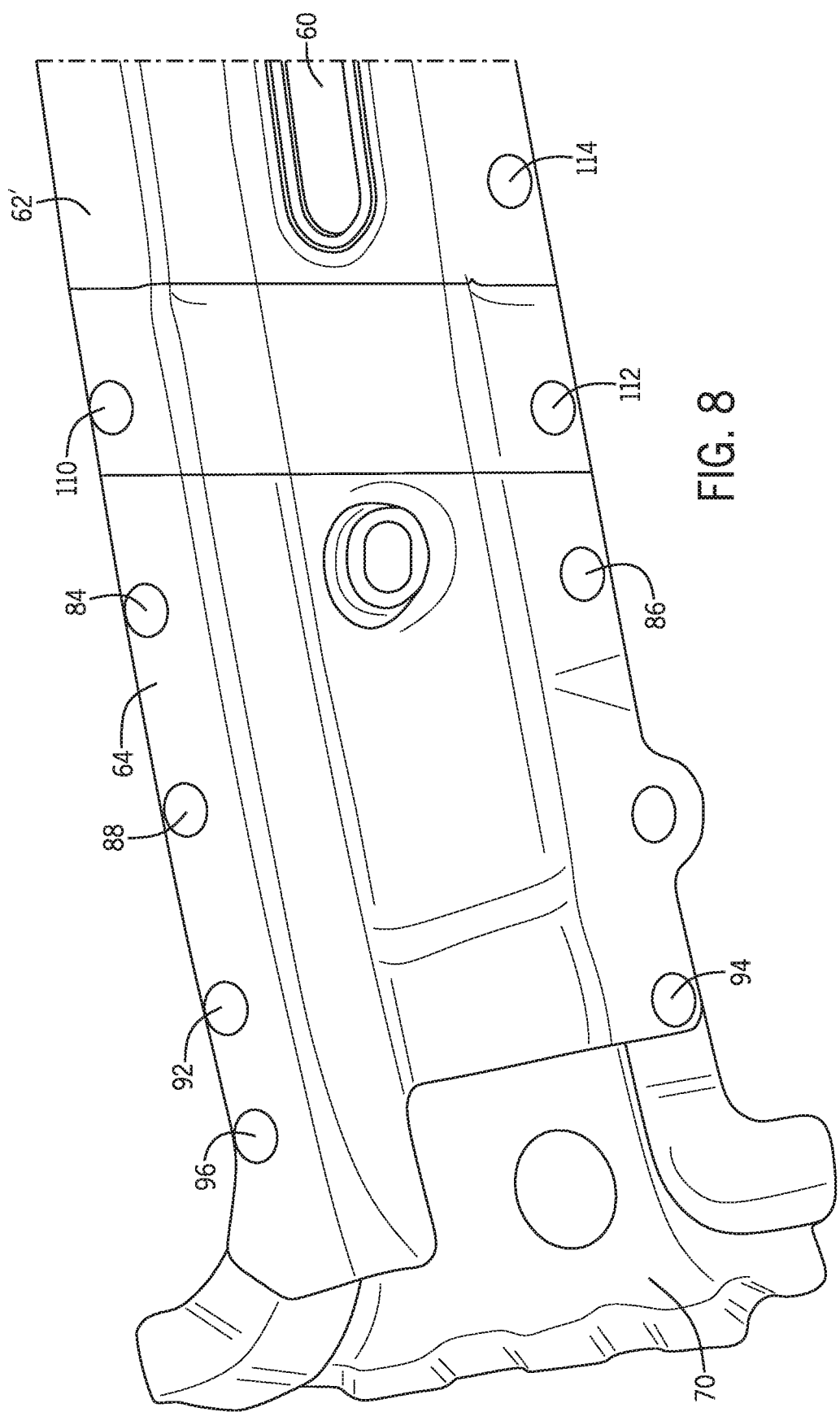
FIG. 8 is a partial enlarged plan view of a roof rail that is similar to FIG. 6 but showing an assembly and joining method according to an alternate exemplary embodiment.
Figure 9:
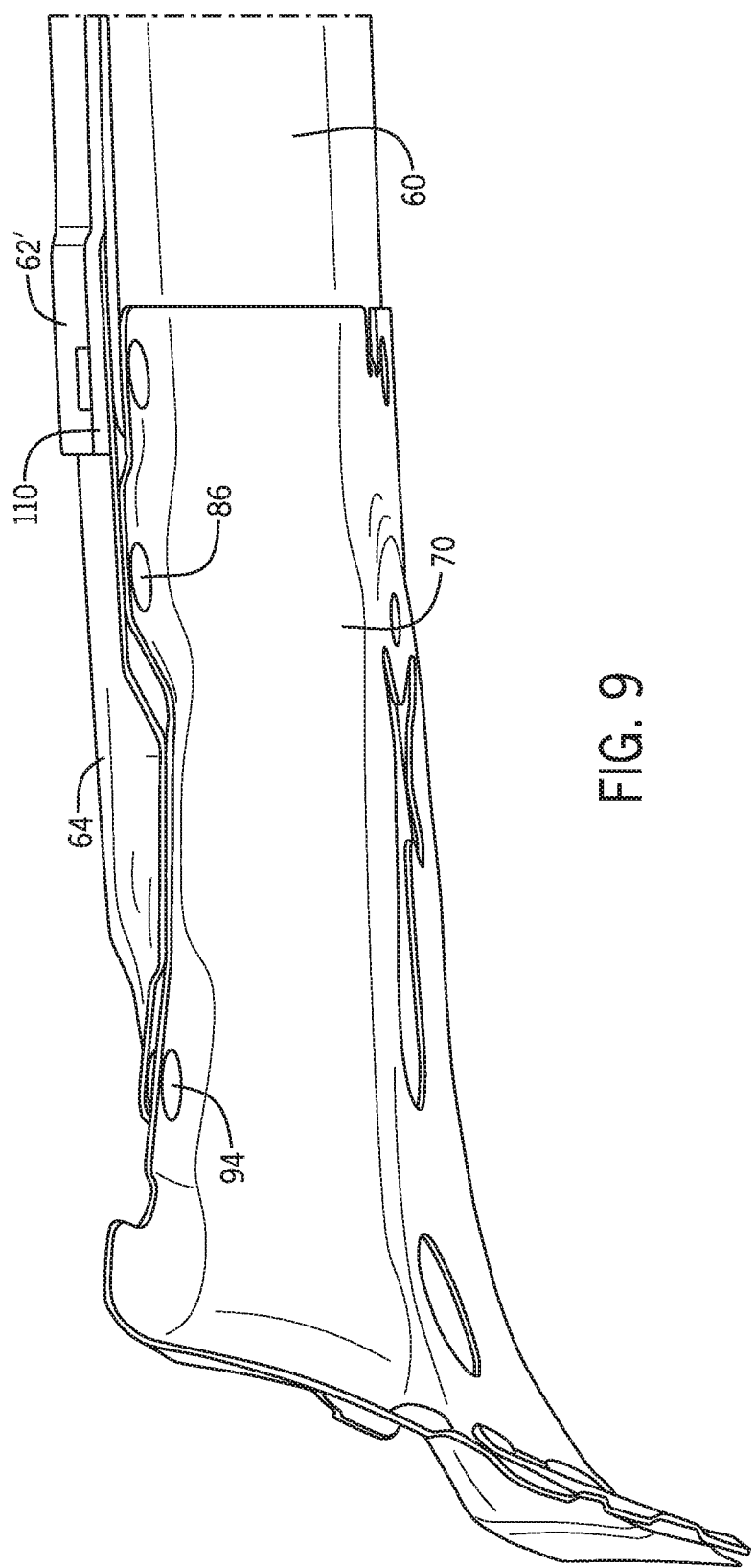
FIG. 9 is a side elevation view of the roof rail of FIG. 8.

In an alternate embodiment, with reference to FIGS. 8 and 9, alternate second frame member 62' replaces the second frame member 62 and an alternate joining method is used for securing the second frame member 62', the first frame member 60, the reinforcement insert 64 and the bracket 70 together. In most respects, the second frame member 62' can be the same as the second frame member 62 of FIGS. 1-7, including being formed of a dissimilar material (e.g., aluminum) relative to the first frame member 60, the reinforcement insert 64 and the bracket 70, but the second frame member 62' does not include the cut-out apertures 94, 96 (FIG. 6). In this alternate assembly and joining method, the first frame member 60, the second frame member 62', the reinforcement insert 64 and the bracket 70 can be arranged or stacked as shown prior to being joined to one another. In particular, the first frame member 60 can be received complementarily overlaid onto bracket 70, the reinforcement insert 64 can be overlaid onto the first frame member 60 and the bracket 70 sandwiching the first frame member 60 (or at least an end portion thereof) between the reinforcement insert 64 and the bracket 70, and the second frame member 62' can be overlaid onto the reinforcement insert 64 and the first frame member 60 with the reinforcement insert 64 (or at least an end portion thereof) sandwiched between the second frame member 62' and the first frame member 60.

Once stacked, the second frame member 62' can be joined to the reinforcement insert 64 using VFAW at locations 110, 112. The second frame member 62' can also be joined to the first frame member 60 using VFAW, such as at location 114. After the second frame member 62' is joined to at least the reinforcement insert 64 using VFAW, resistance spot welding can be applied at the same locations 110, 112 to join the reinforcement insert 64 (with the second frame member 62' already joined thereto via VFAW), the first frame member 60 and the bracket 70 to one another. Resistance spot welding can also be used to join the reinforcement insert 64 to the bracket 70 as already described herein in reference to FIGS. 6 and 7 at locations 84-88 and 92-96.

The advantages of utilizing VFAW include the potential for flexible material combinations, the lack of heat affected zones (HAZ), reduced need for fasteners, higher strength than other cold welding processes and good fatigue strength. Additionally, using VFAW in the illustrated embodiment allows for easy integration of multi-material frame members. This technique can be applied so as to adapt other frame members in the frame assembly 10 to be provided of components with dissimilar metal materials. This could include, for example, the pillars 16-30, the roof rails 32, 34, any portion of the front frame sub-assembly, the lateral roof rails 42-54, etc.

A method for assembling a multi-material vehicle frame will now be described. In particular, the method will be described in association with the vehicle frame assembly for construction 10 described hereinabove, though it should be appreciated and understood that the method could be used with other frame assemblies or constructions. In the method, the first frame member 60 is provided formed of a first metal material, such as steel or a steel alloy. The second frame member 62 is provided formed of a second metal material that is dissimilar to the first metal material, such as aluminum or an aluminum alloy. The second frame member 62 is joined to the first frame member 60 via vaporizing foil actuator welding (VFAW) as described hereinabove.

In the method, the reinforcement inserts 64, 66 can be provided formed of the first metal material in interposed relation between the first frame member 60 and the second frame member 62. The reinforcement inserts 64, 66 can be joined to the first frame member 60 via at least one similar metal material joining technique, such as resistance spot welding (RSW). Also in the method, the second frame member 62 can optionally be joined to the reinforcement inserts 64, 66 via VFAW.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A vehicle frame construction, comprising
a first frame member formed of a first metal material;
a second frame member formed of a second metal material that is dissimilar to said first metal material, wherein the second frame member is joined to the first frame member via vaporizing foil actuator welding (VFAW); and
a reinforcement insert interposed between the first frame member and the second frame member, the reinforcement insert formed of the first metal material and joined to the first frame member via at least one similar metal material joining technique,
wherein the first frame member is a first roof rail member and the second frame member is a second roof rail member, the first and second roof rail members extending laterally between associated side frame members.

2. The vehicle frame construction of claim 1 wherein the second frame member is joined to the reinforcement insert via VFAW.

3. The vehicle frame construction of claim 2 wherein the second frame member is joined to the first frame member and the reinforcement insert only via VFAW.

4. The vehicle frame construction of claim 1 wherein the at least one similar metal material joining technique is resistance spot welding (RSW).

5. The vehicle frame construction of claim 1 wherein the second metal material is lighter than the first metal material for reducing weight of the vehicle frame construction.

6. The vehicle frame construction of claim 1 wherein the second metal material is aluminum or an aluminum alloy and the first metal material is steel or a steel alloy.

7. The vehicle frame construction of claim 1 wherein the second frame member is joined to the first frame member only via VFAW.

8. The vehicle frame construction of claim 1 wherein the first roof rail member is a lower roof rail and the second roof rail member is an upper roof rail arranged to extend along the lower roof rail between the associated side frame members.

9. The vehicle frame construction of claim 8 wherein the first metal material is steel or a steel alloy and wherein the lower roof rail includes:
a base wall,
spaced apart sidewalls extending upward from the base wall that together with the base wall define a lower roof rail U-shaped open section, and
lower roof rail welding flanges extending outwardly from the spaced apart sidewalls and located distally relative to the base wall.

10. The vehicle frame construction of claim 9 wherein the second metal material is aluminum or an aluminum alloy and wherein the upper roof rail includes upper roof rail welding flanges that are joined to the lower roof rail welding flanges via VFAW to close the open section.

11. The vehicle frame construction of claim 10 wherein the reinforcement insert has reinforcement insert flanges that are joined to the lower roof rail welding flanges via resistance spot welding.

12. The vehicle frame construction of claim 9 further including:
a bracket formed of the first metal material for joining to the associated side frame members, wherein the bracket and the lower roof rail are joined to the bracket via resistance spot welding.

13. The vehicle frame construction of claim 12 wherein the bracket has a bracket U-shape into which the lower roof rail U-shaped open section is complementarily received.

14. The vehicle frame construction of claim 1 further including:
a bracket formed of the first metal material for joining to the first and second frame members to an associated side frame member, wherein the reinforcement insert and the first frame member are joined to the bracket via resistance spot welding.

15. A multi-material frame assembly for a vehicle, comprising:
- a first frame member formed of a first metal material;
- a second frame member formed of a second metal material that is dissimilar to said first metal material;
- a reinforcement insert interposed between the first frame member and the second frame member, the reinforcement insert formed of the first metal material and joined to the first frame member via resistance spot welding; and
- a bracket formed of the first metal material for joining to the first and second frame members to an associated side frame member, wherein the reinforcement insert and the first frame member are joined to the bracket via resistance spot welding,
- wherein the second frame member is joined to at least one of the first frame member or the reinforcement insert via vaporizing foil actuator welding (VFAW).

16. A method for assembling a multi-material roof rail to be extended laterally between vehicle side frame member, comprising:
- providing a first roof rail member formed of a first metal material;
- providing a second roof rail member formed of a second metal material that is dissimilar to said first metal material;
- joining the second roof rail member to the first roof rail member via vaporizing foil actuator welding (VFAW);
- providing a reinforcement insert formed of the first metal material in interposed relation between the first roof rail member and the second roof rail member; and
- joining the reinforcement insert to the first roof rail member via resistance spot welding.

17. The method of claim 16 further including:
- joining the second roof rail member to the reinforcement insert via VFAW.

* * * * *